Sept. 1, 1970           L. E. WOOD           3,526,336
PRESSURE VESSEL SAFETY DEVICE
Filed Jan. 2, 1969           2 Sheets-Sheet 1
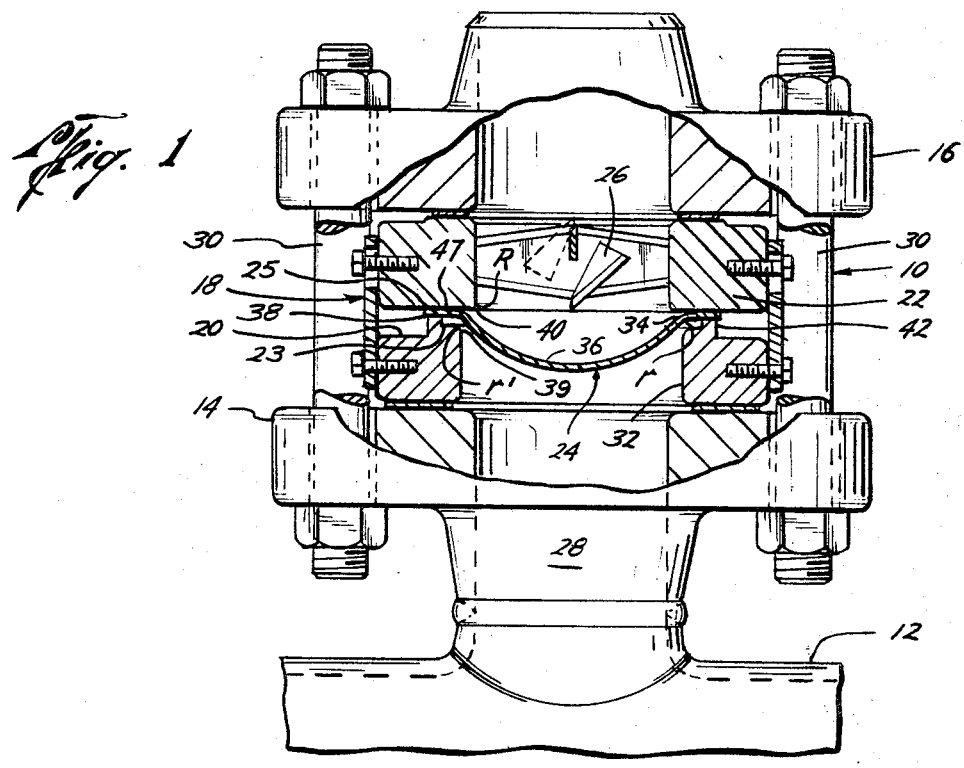
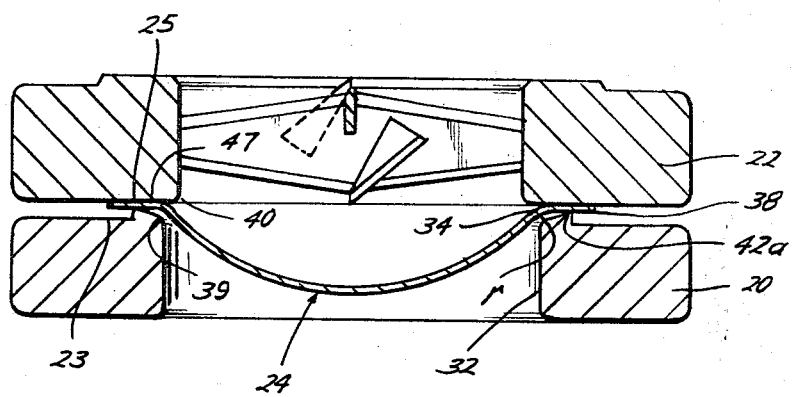
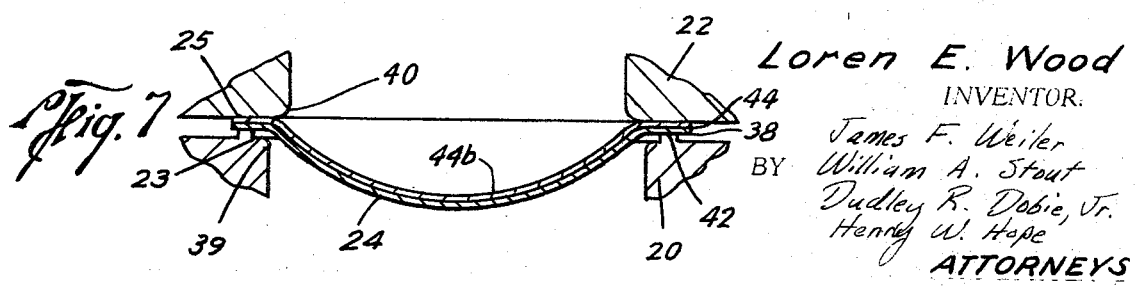
Loren E. Wood
INVENTOR.
BY James F. Weiler
William A. Stout
Dudley R. Dobie, Jr.
Henry W. Hope
ATTORNEYS

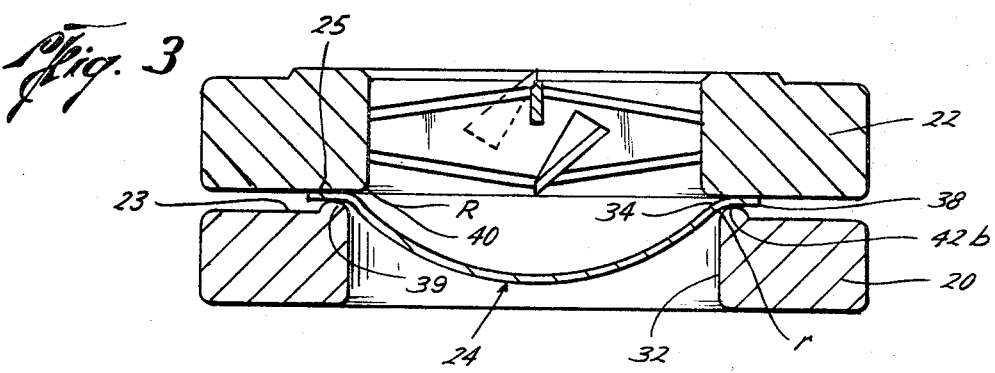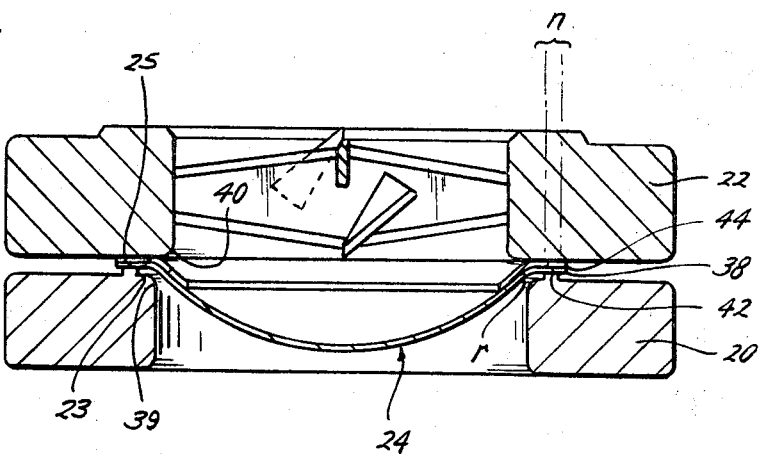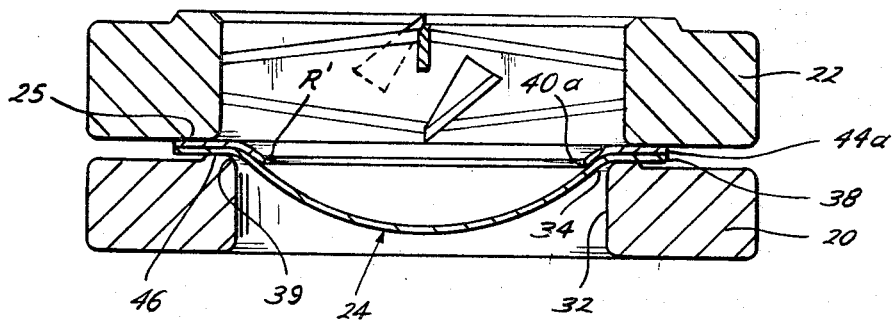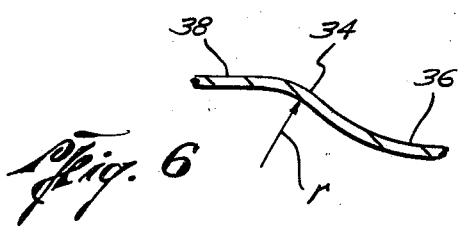

United States Patent Office 3,526,336
Patented Sept. 1, 1970

3,526,336
PRESSURE VESSEL SAFETY DEVICE
Loren E. Wood, Kansas City, Mo., assignor to Black, Sivalls & Bryson, Inc., Kansas City, Mo., a corporation of Delaware
Continuation-in-part of application Ser. No. 601,440, Dec. 13, 1966. This application Jan. 2, 1969, Ser. No. 788,548
Int. Cl. B65d 25/00, 47/36
U.S. Cl. 220—89                14 Claims

ABSTRACT OF THE DISCLOSURE

A reversing rupture disk type of safety device for relieving excess pressure built up within a pressure vessel, the disk being compressively supported between inlet and outlet support members wherein the inlet member is provided with a protruding annulet to permit over-bolting of the device without altering disk reversal pressure. A support ring may be positioned between the disk and outlet member to increase disk reversal pressure a predetermined amount.

CROSS-REFERENCE TO RELATED APPLICATION

This is a continuation-in-part of related Ser. No. 601,440 filed Dec. 13, 1966 with the same title and now abandoned.

BACKGROUND OF THE INVENTION

As disclosed in my U.S. Pat. No. 3,294,277 for a related device, rupture disks of the reverse safety buckling type are capable of operating successfully at 90% or more of rated reverse pressure (pressure at which the disk is rated to reverse or buckle) without premature failure of the disk due to erratic buckling caused by creep and fatigue of metals. Successful operation of such a safety device at close to its rated reversal pressure is attributable, among other things, to the improved seat configurations of the inlet and outlet supporting members between which the concave-convex disk is supported. Nevertheless, problems have persisted in attaining the correct degree of compression of the inlet and outlet supporting members so that the rupture disk is sealingly retained without alteration of the configuration of the disk due to compressive forces which tend to increase the pressure at which the disk reverses. For example, when a workman unknowingly overbolts the housing which engages the inlet and outlet supporting members with the disk, the pressure at which the disk will reverse is increased thereby subjecting the pressure vessel to possible accidental explosive damage. The point at which such device becomes overbolted is generally difficult to determine so that in conventional devices uncertainty exists as to whether or not the disk will reverse at the rated pressure.

Again referring to the above U.S. patent, the provision of a reverse buckling disk having a flat flange portion connected to a concave-convex portion by a radial transitional connection and the corresponding provision of an inlet supporting member having a rounded shoulder for coaction with the radial transitional connection of the disk for support of the disk during reverse or back pressure (for example a pressure created by a vacuum within the protected vessel) results in a safety device having a reversal pressure limited by the maximum thickness of the disk which may be used for a given radius r (as described hereafter) of the transitional connection. Thus for a given radius of the transitional connection of the disk, thickness of the disk is in turn limited which limits the maximum reversal pressure of the disk and the device is therefore useful only for a relatively low pressure environment. The present invention provides means for effectively increasing the reversal pressure a predeterminable amount for a given transitional radius and disk thickness which would otherwise be limited to a lower reversal pressure.

SUMMARY OF THE INVENTION

The present invention is directed to the provision of a raised face evenly distributed and spaced outside the inner edge of the inlet supporting member to form an annulet for leading contact with the annular flat flange portion of the disk so that compression such as by bolting of the inlet and outlet supporting members may be increased without corresponding increase or alteration of disk reversal pressure. The concept of the raised face of the inlet supporting member for leading contact with the flat flange of the disk transmits the compressive loading between the inlet and outlet supporting members to the flat flange portion of the disk outside of the small radial transitional connection thereof. As a result, the inlet and outlet supporting members may be bolted together with substantially excessive compressive force acting on the flat flange of the disk at a point outside the small radial transitional connection such that critical areas of the disk such as the transitional radius and the concave-convex portions are not altered by such over-bolting. At the same time, when the pressure vessel is placed in operation and the concave-convex disk experiences reverse or back pressure, the radial transitional connection of the disk may still be supported preferably by the interior edge of the inlet supporting member coacting with the radial transitional connection of the disk to minimize fatigue of the disk which in turn would cause premature failure.

The present invention advantageously further provides a supporting ring for positioning between the disk and the outlet supporting member whereby for a given disk thickness and transitional connection radius which limits the disk to a maximum rupture or reversal pressure, the reversal pressure may be increased a predetermined amount. The extent to which the reversal pressure of the disk may be increased is predominently a function of the inside diameter of the support ring. Thus, as the inside diameter of the support ring is decreased, reversal pressure of the disk is increased. Advantageously, when the support ring is combined with the provision of a raised face on the inlet supporting member for leading contact with the disk, a safety device for pressure vesels having outstanding performance characteristics is provided wherein reversal pressure of the device may be increased a predetermined amount and at the same time the device may be over-bolted without danger of increasing such reversal pressure an unknown amount.

It is, therefore, an object of the present invention to provide an improved safety device for pressure vessels wherein through the provision of protrusive annulet means for leading contact of the inlet supporting member with the concave-convex disk of the device, the device may be subjected to significantly increased compressive forces without altering reversal pressure of the disk.

A further object of the present invention is the provision of a support ring for coaction with the outlet supporting member and the radial transitional connection of the disk whereby reversal pressure which would otherwise be limited by the given disk thickness and transitional connection radius is increased a predetermined amount.

Yet a further object of the present invention is to provide a safety device with outstanding performance characteristics through the provision of a support ring to increase reversal pressure of the disk a predetermined amount and through the provision of annulet means on the inlet supporting member such that the device may be substantially over-bolted without danger of increasing reversal pressure an unknown amount.

Other and further objects, features and advantages will be apparent from the following description of presently preferred embodiments of the invention, given for the purpose of disclosure, and taken in conjunction with the accompanying drawing.

DESCRIPTION OF THE DRAWINGS

In the drawings forming a part of the disclosure herein, like character references designate like parts throughout the several views wherein, FIG. 1 is an elevational view, partly in cross-section, of a reverse buckling safety device of the present invention connected to a pressure vessel and wherein is shown one embodiment of an annulet means, FIG. 2 is a cross-sectional side view of the inlet and outlet supporting members for compressively engaging the concave-convex rupture disk illustrating another annulet means of the inlet supporting member for leading contact with the flat flange portion of the disk, FIG. 3 likewise illustrates an additional embodiment of the annulet means of the inlet supporting members, FIG. 4 is a cross-sectional side view of the inlet and outlet supporting members and the concave-convex rupture disk wherein a support ring is positioned between the disk and the outlet supporting members, FIG. 5 similarly illustrates a modified support ring and supporting members, FIG. 6 is a partial cross-sectional view showing the radius of the transitional connection of the disk, and FIG. 7 is a partial cross-sectional view similar to that of FIG. 4 and showing a support ring without an aperture.

DESCRIPTION OF THE PREFERRED EMBODIMENT

The present invention generally comprises an improvement of the safety device such as is described in my U.S. patent cited at the outset. The device is of the character illustrated in FIG. 1 wherein reference numeral 10 designates the safety device for use on a pressure vessel 12 for protection of the vessel from excess pressure. The safety device 10 generally includes a pair of housing members such as pipe flanges 14 and 16 and a subassembly 18. The sub-assembly 18 in which lies the improvement of the present invention, comprises a pair of clamping rings or disk supporting members 20 and 22 each having flat portions 23 and 25 respectively terminating inwardly in the same plane as the flat portions wherein the flat portion 25 of member 22 and annulet means 42 of member 20 compressively engage the reverse buckling disk 24. A knife or shearing assembly 26 is suitably secured to the outlet supporting member 22 for opening the disk 24 when it buckles at reversal pressure.

The pipe flange 14 is provided with a neck 28 which may be secured to the pressure vessel 12 as by welding. Each of the pipe flanges 14 and 16 may include a plurality of circumferential openings so that the pipe flanges 14 and 16 may be securely fastened together such as by bolts 30 for aligning and securing the sub-assembly 18 whereby the convex side of the reverse buckling disk 24 will be exposed to the pressure in the vessel 12.

In the present invention, the reverse buckling disk 24 is provided with a radial transitional connection 34 having a radius $r$ (FIG. 6) whereby the concave-convex portion 36 of the disk is integrally formed with the flat flange portion 38 of the disk. Such flat flange portion 38 is compressively engaged between the inlet and outlet supporting members as shown in FIG. 1.

While not critical, preferably coacting with the small radial transitional connection 34 of the disk 24 is a corresponding rounded corner 39 of the shoulder 23 of the inlet supporting member 20. Such rounded corner is also of a small radius $r'$ to support the transitional connection of the disk when such disk experiences reverse or back pressure. The back-up shoulder 47 of the outlet member 22 coacts with the annular flange 38 of the disk 24 under pressure to support the transitional radius $r$ of the disk thereby preventing erratic buckling of the disk while the rounded corner 40 of the back-up shoulder 47 minimizes tearing of the disk into loose pieces when sheared by the knife means 26 at rupture or reversal pressure. Moreover, the combination of the outlet shoulder 47 and the radial transitional connection of the disk 24 permits operation of the safety device 10 at pressures up to approximately 90% of the rated reversal pressure of the disk.

The improvement of the present invention provides an annulet or raised face 42 protruding from the flat face 23 of the inlet supporting member 20 for leading contact with the disk 24. Such leading contact by the protruding annulet 42 provides a sealing connection and more importantly places compressive loading forces of the inlet and outlet supporting members on the flat flange portion 38 of the disk 24 at a point outside of the radial transitional connection 34 of the disk and outside of the rounded corner 39 of the inlet supporting member. The unexpected result of such spaced and protruding annulet for leading contact with the disk is that the bolts 30 may be tightened excessively without altering configuration of the disk 24 whereby the disk would otherwise assume a higher and unknown reversal pressure.

For example, in a typical safety device as shown in FIG. 1, compressive loading of the disk 24 between the inlet and outlet supporting members 20 and 22 is typically 20,000 p.s.i. as a result of tightening the bolts 30. However, prior to the present invention, if the bolts 30 were tightened in excess of such compressive loading, the configuration of the disk 24 would be altered and reversal pressure of the disk would be increased an amount determinable only by experiencing actual reversal pressure. Naturally, this is an undesirable situation since the reversal pressure of the disk in operation should not increase at any time. By use of the annulet or raised face 42 according to the improvement of the present invention, compression by tightening of the bolts 30 can even be doubled, for example to 40,000 p.s.i. without any appreciable increase in reversal pressure of the disk 24. Thus, the reversal pressure is not increased even when the bolts are overloaded by an unknowing workman.

Alternative embodiments of the protruding annulet or raised face 42 are illustrated in FIGS. 2 and 3. In FIG. 2, the protruding annulet is in the form of an inwardly tapering raised face 42a wherein the apex or most elevated point of the raised face is the outer portion thereof. Of course, the inlet supporting member 20 is still provided preferably with a rounded corner 39 for support of the radial transitional connection 34 of the concave-convex disk 24 under reverse or back pressure.

In FIG. 3, the protruding annulet or raised face is arcuate in configuration as designated by the reference character 42b. Again, the apex or most elevated point of the raised face is outside of the rounded corner 39 of the inlet supporting member 20 and the transitional connection 34 of the disk 24. As in the tapering face of FIG. 2, compressive loading of the disk 24 between the inlet and outlet supporting members 20 and 22 occurs at the most elevated point of the raised face 42b which in effect is a leading edge for contact with the flat flange portion 38 of the disk 24 so that such disk may be overbolted without altering reversal pressure thereof.

As is equally applicable to all embodiments of the protruding annulet or raised face 42 of the present invention, the distance between the inner edge of the annular flange 38 of the disk 24 and the leading edge of the protruding annulet 42 (or 42a or 42b) is not critical so long as such leading edge is outside of the inner edge of the annular flange 38 of the disk 24 and the transitional connection 34 of the disk 24. In other words, the objective of the protruding annulet or raised face 42 is to cause the compressive loading of the disk by the inlet and outlet supporting members 20 and 22 to occur at a point outside radially of the transitional connection 34 of the concave-convex disk 24 rather than adjacent thereto. Likewise, the extent of elevation or protrusion of the leading edge of the raised annulet portion 42 (42a or 42b) of the inlet supporting member 20 is not critical so long as proper sealing of the disk is effected. Limitations on extent of elevation are mechanical only since elevation of the protruding annulet must not be so great as to create added stresses in the disk during cyclic pressuring which would cause premature failure of the disk by cracking or by buckling prematurely. Furthermore, the effective width of the leading edge such as is represented by $n$ in FIG. 4 is not critical so long as there is no excessive "biting" or cutting of the disk such as would injure the flat flange portion 38 of the disk sufficiently to cause erratic buckling of the disk.

As shown in FIG. 4, the present invention provides yet a further improvement of the concave-convex reverse buckling disk safety device by a support ring 44 which may be either separate or integrally formed of the outlet supporting member 22 as desired. By the use of such a support ring, it has been discovered that the reversal pressure of a particular concave-convex disk may be increased predetermined amounts with desirable advantages. The desirability of increased several pressure becomes clear when it is considered that for a given disk thickness and transitional connection radius $r$ of the disk, the disk is limited to given rupture or reversal pressure. In other words, the radius $r$ of the transitional connection 34 of the disk 24 limits thickness of the disk which in turn places an upper limitation on reversal pressure for which the disk may be used. The support ring 44 increases such reversal pressure for which the disk may be used. The support ring 44 increases such reversal pressure in an amount which may be varied by decreasing the inside diameter of the ring 44 to increase reversal pressure of the disk 24. Thus a disk having a certain transitional connection radius $r$ and thickness will have a given reversal pressure which may be increased a predetermined amount through the use of the support ring which in turn may be combined with the protruding annulet or raised face 42 so that the entire combination may be overbolted for use at a higher yet predetermined reversal pressure rather than a higher unknown reversal pressure.

Thus, as shown in FIG. 4, the support ring 44 conforms with the curvature of the disk 24 as well as with the radial transitional connection 34 and flat flange portion 38 thereof. It has been found that, to be effective, the inside diameter of the support ring 44 must be small enough to provide support for at least a portion of the radial transitional connection 34 of the disk 24.

With reference now to FIG. 5, a modified support ring 44a is illustrated conforming with the concave-convex disk 24. In this embodiment, the inlet supporting member 20 is provided with a flat face 46 for supportably engaging the flat flange portion 38 of the disk wherein the inlet supporting member 20 is also provided with a rounded corner 39 to supportingly engage the transitional connection 34 of the disk. It will be noted that the inlet supporting member 20 thus has no protruding annulet such as the raised face 42 of FIG. 1 for leading contact with the flat flange portion 38 of the disk. Thus, this embodiment is not capable of being over-bolted without altering disk reversal pressure. However, the support ring 44a, provided with an inner edge 40a rounded to a radius R'; coacts with the disk under pressure to support the disk for prevention of erratic buckling. The radius R' of the support ring 44a minimizes tearing into loose pieces when the disk 24 reverses and is sheared by the knife means 26 at reversal pressure. Thus, in this embodiment, the support ring 44a functions both to increase reversal pressure of the disk 24 and to support the disk so that the safety device as a whole may be operated at pressures as high as 90% of the reversal pressure of the disk. In such case, the outlet supporting member 22 need not be provided with a rounded corner 40 as in FIG. 4, extending inwardly further than the inside edge 32 of the inlet member 20 as illustrated in FIG. 1 since the function of the outlet shoulder is uniquely incorporated by the support ring 44a. Of course, the configuration of the inlet member 20 of FIG. 4 could be used as the configuration of inlet member 20 of FIG. 5, thus gaining the advantages of the annulet 42 for overbolting and the support ring 44a for supporting the disk during pressure operation.

Referring once again to FIG. 4, the support ring 44a may be of an inside diameter coextensive with the radial transitional connection 34 of the disk 24 or may have no inside aperture whatsoever as represented by the reference numeral 44b in FIG. 7. It has been discovered that by decreasing the inside diameter of the support ring 44, reversal pressure of the disk 24 is thereby increased. For example, for a given disk having a thickness of $t$, and formed of a given material, if the inside diameter of the support ring 44 supports a portion of the radial transitional connection 34 of the disk 24, and if the support ring is formed of the same material as the disk and has the same thickness $t$, a reversal pressure of the disk will be increased approximately 10% by use of the support ring 44. If the inside diameter of the same support ring 44 is decreased to zero so that the support ring extends completely across the concave-convex portion of the disk, the reversal pressure of the disk 24 will be approximately doubled. A resulting advantage of the use of the support ring 44 as shown in any of the drawings (when the inside diameter thereof is not zero) is that while the reversal pressure of the disk 24 in increased, the knife blade means 26 still must pierce and cut only the thickness $t$ of the disk 24. Thus, for higher reversal pressures when the support ring 44 is used, a disk 24 with no corresponding increase in thickness is presented to the knife means 26. A direct result is that an excessively sharp knife is not required to pierce the disk 24 upon reversal thereof as would be the case if the thickness of the disk were increased in order to obtain the increased reversal pressure.

It will be recognized that the support ring 44 may be formed of a variety of materials in a wide range of thicknesses and inner diameters resulting in variable degrees of support for the disk 24. Thus the reversal pressure of the disk 24 may be raised from 10% to 100% depending upon the particular support ring used. The degree to which a support ring 44 will raise the reversal pressure may, of course, be predetermined by use of pressure-test equipment before installation as can be carried out by one skilled in the art.

In use, the reverse buckling disk 24 is assembled into the sub-assembly 18 which is then bolted between the pipe flanges 14 and 16 as shown in FIG. 1. Because of the protruding annulet or raised face 42 of the inlet supporting member 20, the housing containing the inlet and outlet supporting members and the desk 24 may be overbolted to excessively high compressive loads without altering the reversal pressure of the disk. A support ring 44 may be used in combination therewith as described to increase such reversal pressure a known amount depending upon the thickness and inside diameter of such support ring and the elastic characteristics of the material from which it is formed.

Thus provided is an improved safety device which may be overbolted without increasing reversal pressure of the concave-convex rupture disk therein yet one in which such reversal pressure may be increased a predetermined amount through the provision of a support ring.

What is claimed is:
1. A safety device for coaction with a pressure vessel comprising,
 a concave-convex disk with the convex portion for subjection to the pressure of the vessel, the disk having an annular flat flange integrally connected to its concave-convex portion by a radial transitional connection, an outlet supporting member having a flat flange portion for support of the flat flange of the disk on the concave side thereof, and an inlet supporting member for support of the flat flange of the disk on the convex side thereof and having protruding annulet means concentrically spaced outside the transitional connection of the disk for leading contact with the annular flat flange of the disk such that compression of the inlet and outlet supporting members may be increased without altering of disk reversal pressure.

2. The invention of claim 1 wherein the protruding annulet means of the inlet supporting member concentrically spaced outside the transitional connection of the disk more particularly is an annular protrusion projecting from the plane of the flat portion of the inlet supporting member.

3. The invention of claim 1 wherein the protruding annulet means concentrically spaced outside the transitional connection of the disk more particularly is an annular protrusion having an arcuate face projecting from the plane of the flat portion of the inlet supporting member, the apex of said arcuate face providing leading contact with the annular flat flange of the disk.

4. The invention of claim 1 wherein the protruding annulet means concentrically spaced outside the transitional connection of the disk more particularly is an annular protrusion having a tapering face projecting from the plane of the flat portion of the inlet supporting member, the apex of said tapering face providing leading contact with the annular flat flange of the disk.

5. The invention of claim 4 wherein more specifically the annular protrusion tapers inwardly.

6. A safety device for coaction with a pressure vessel including, a concave-convex disk with the convex portion for subjection to the pressure vessel, the disk having an annular flat flange integrally connected to the concave-convex section by a small radial transitional connection having a radius $r$, inlet and outlet supporting members coacting with and supporting the flat flange of the disk, and a support ring conforming with the curvature of the disk and securably positioned between the disk and the outlet supporting member.

7. The invention of claim 6 wherein more specifically the support ring is coextensive with the concave-convex curvature of the disk to approximately double the reversal pressure of said disk when said support ring is of the same thickness and formed of material having elastic properties similar to that of the disk.

8. The invention of claim 6 wherein more specifically the inside edge of the support ring terminates approximately coextensive with the radial transitional connection of the disk.

9. The invention of claim 8 wherein additionally the inside edge of the support ring adjacent the radial transitional section of the disk is rounded.

10. In a safety device for a pressure vessel having a concave-convex disk compressively supported between inlet and outlet supporting members with the convex portion subjected to the pressure of the vessel, the disk being of the type having an annular flat flange connected to the concave-convex section by a small radial transitional connection having radius $r$, and each of said supporting members including flat portions to coact with and support the flat flange, the inlet member terminating inwardly in the same plane as its flat portion with a rounded shoulder coacting to support the radial transitional connection during reverse pressure, the improvement comprising, the flat portion of the inlet supporting member having annulet means concentrically spaced outside the inwardly terminating rounded shoulder thereof for leading contact with the annular flat flange of the disk whereby compression of the inlet and outlet supporting members may be increased without altering reversal pressure, and a support ring conforming with the curvature of the disk and compressively positioned between the disk and the outlet supporting member, the support ring having an inside diameter whereby as said inside diameter is decreased, reversal pressure of the disk is increased.

11. The invention of claim 10 wherein more specifically the inside edge of the support ring terminates coextensive with the radial transitional connection of the disk.

12. In a safety device for a pressure vessel having a concave-convex disk compressively supported between inlet and outlet supporting members with the convex portion subjected to the pressure vessel, the disk being of the type having an annular flat flange connected to the concave-convex section by a small radial transitional connection having radius $r$, and each of said supporting members including flat portions to coact with and support the flat flange, and the flat portion of each of the supporting members terminating inwardly in the same plane as its flat portion, the combination with said disk and inlet and outlet supporting members of the improvement comprising, the flat portion of the inlet supporting member having annulet means concentrically spaced outside the transitional connection of the disk for leading contact with the annular flat flange of the disk whereby compression of the inlet and outlet supporting members may be increased without altering disk reversal pressure, and a support ring conforming with the curvature of the disk and securably positioned between the disk and the outlet supporting member.

13. The invention of claim 12 wherein more specifically the inside edge of the support ring terminates coextensive with the radial transitional connection of the disk.

14. The invention of claim 13 wherein additionally the inside edge of the support ring adjacent the radial transitional connection of the disk is rounded to a radius $R'$, the interior of the rounded edge $R'$ being positioned inwardly further than the inward terminus of the inlet member by a distance at least as great as $R'$ thereby providing a back-up shoulder against and supporting the transitional connection.

References Cited

UNITED STATES PATENTS

| | | |
|---|---|---|
| 2,453,891 | 11/1948 | Burt. |
| 2,758,749 | 8/1956 | Jones _____ 220—89 |
| 3,155,271 | 11/1964 | Sommers et al. |

FOREIGN PATENTS

| | | |
|---|---|---|
| 578,008 | 6/1946 | Great Britain. |

RAPHAEL H. SCHWARTZ, Primary Examiner